United States Patent
Ellis et al.

(10) Patent No.: US 12,393,429 B2
(45) Date of Patent: Aug. 19, 2025

(54) ATOMIC INSTRUCTION SET AND ARCHITECTURE WITH BUS ARBITRATION LOCKING

(71) Applicant: Microchip Technology Incorporated, Chandler, AZ (US)

(72) Inventors: Robert Ellis, Gilbert, AZ (US); Stephen Bowling, Chandler, AZ (US); Michael Catherwood, Tyler, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/302,874

(22) Filed: Apr. 19, 2023

(65) Prior Publication Data

US 2023/0342158 A1    Oct. 26, 2023

Related U.S. Application Data

(60) Provisional application No. 63/333,143, filed on Apr. 21, 2022.

(51) Int. Cl.
*G06F 9/38* (2018.01)
*G06F 13/366* (2006.01)

(52) U.S. Cl.
CPC .......... *G06F 9/3861* (2013.01); *G06F 13/366* (2013.01)

(58) Field of Classification Search
None
See application file for complete search history.

(56) References Cited

U.S. PATENT DOCUMENTS

| | | | | |
|---|---|---|---|---|
| 5,937,199 A * | 8/1999 | Temple | ................... | G06F 13/24 710/262 |
| 6,243,786 B1 | 6/2001 | Huang et al. | ................. | 710/262 |
| 7,627,723 B1 * | 12/2009 | Buck | ................... | G06F 9/30018 711/155 |
| 8,042,086 B2 * | 10/2011 | Tseng | ................... | G06F 11/263 714/739 |
| 11,061,680 B2 * | 7/2021 | Biran | ................... | G06F 9/30087 |
| 11,126,474 B1 * | 9/2021 | Zidenberg | ............. | G06F 9/5016 |
| 11,556,485 B1 * | 1/2023 | Tong | ................... | G06F 12/0879 |
| 2002/0038416 A1 * | 3/2002 | Fotland | ................. | G06F 9/4881 712/228 |
| 2006/0294326 A1 | 12/2006 | Jacobson et al. | ............. | 711/156 |

(Continued)

OTHER PUBLICATIONS

Regehr, J. et al., Safe and Structured Use of Interrupts in Real-Time and Embedded Software, 2006, Univ. of Utah, pp. 1-15. (Year: 2006).*

(Continued)

*Primary Examiner* — Eric Coleman
(74) *Attorney, Agent, or Firm* — SLAYDEN GRUBERT BEARD PLLC

(57) ABSTRACT

An article of manufacture includes a non-transitory machine-readable medium. The medium includes instructions. The instructions, when read and executed by a processor, cause the processor to identify a first input instruction in a code stream to be executed, determine that the first input instruction includes an atomic operation designation, and selectively block interrupts for a duration of execution of the first input instruction and a second input instruction. The second input instruction is to immediately follow the first input instruction in the code stream.

20 Claims, 12 Drawing Sheets

(56) References Cited

U.S. PATENT DOCUMENTS

| | | | |
|---|---|---|---|
| 2008/0229083 A1 | 9/2008 | May ............................ | 712/228 |
| 2012/0144119 A1* | 6/2012 | Serebrin ............. | G06F 9/30189 |
| | | | 711/125 |
| 2012/0144172 A1* | 6/2012 | de Cesare ............... | G06F 13/24 |
| | | | 712/244 |
| 2014/0122845 A1* | 5/2014 | Chung ................ | G06F 9/30116 |
| | | | 712/228 |
| 2021/0096930 A1* | 4/2021 | Shafi ................... | G06F 9/30101 |

OTHER PUBLICATIONS

Partial International Search Report and Written Opinion, Application No. PCT/US2023/019351, 14 pages, Aug. 1, 2023.
International Search Report and Written Opinion, Application No. PCT/US2023/019351, 21 pages, Sep. 25, 2023.

\* cited by examiner

ATOMIC INSTRUCTION SET AND ARCHITECTURE WITH BUS ARBITRATION LOCKING

PRIORITY

This application claims priority to U.S. Provisional Patent Application No. 63/333,143 filed Apr. 21, 2022, the contents of which are hereby incorporated in their entirety.

FIELD OF THE INVENTION

The present disclosure relates to processor instruction sets and, more particularly, to an atomic instruction set and architecture with bus arbitration locking.

BACKGROUND

In execution of instructions, processors that are running programs can interrupt such programs. Some processors use different modes of operation, such as a "user" mode and a "supervisor", wherein interrupts can only be selectively controlled or suppressed by entering the supervisor mode. Inventors of examples of the present disclosure have discovered that entering such supervisor modes may increase latency and overhead, and may be unsuitable for embedded or real-time systems. Interrupts may cause the execution flow of the program to be changed to address the interrupt. Inventors of examples of the present disclosure have discovered that embedded systems may benefit wherein some segments of code operate without interruption. An example is when performing an operation that uses a two or more byte write operation to fully setup an I/O device address fully. If the first byte is sent out, an interrupt might change the execution flow and the interrupt routine may write to the same device and issues different address to be output. The device which already has the first address byte from before the interrupt will interpret the first byte of the interrupting routine as the second address byte of the original command sequence.

Inventors of examples of the present disclosure have discovered that there may be substantial overhead associated with controlling interrupts in an embedded system. Moreover, inventors of examples of the present disclosure have discovered that the use of allowing user programs to control interrupts may be risky and can lead to bugs both overt and subtle. Inventors of examples of the present disclosure have discovered that there may be a level of program latency incurred by programming overhead of controlling system level controls like interrupts.

Inventors of examples of the present disclosure have discovered instruction sets and mechanisms for controlling interrupts and busses to address one or more of the issues discussed above.

DETAILED DESCRIPTION

Figure 1:
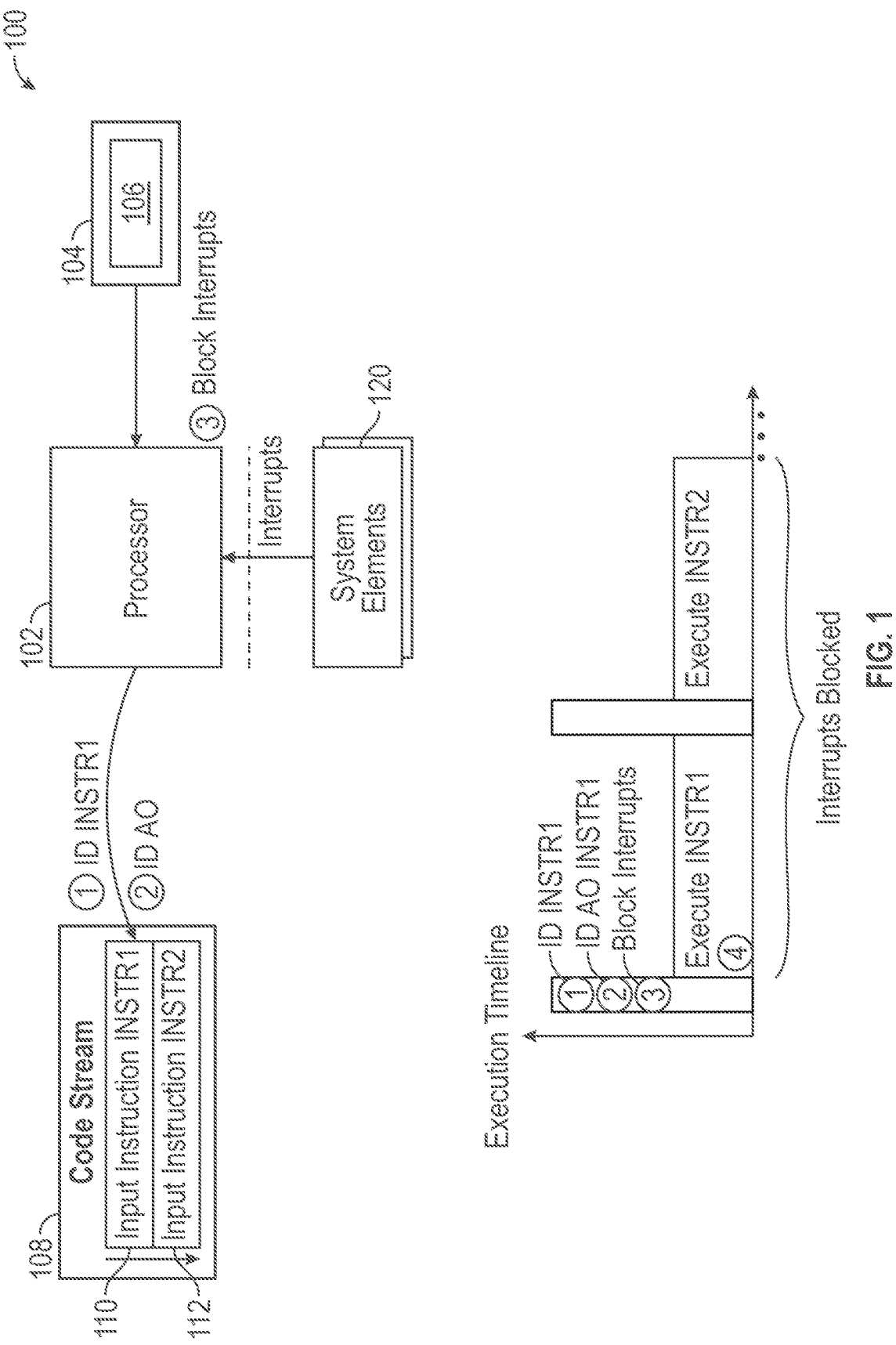
FIG. 1 is an illustration of a system with an atomic instruction set and architecture with interrupt and bus arbitration locking, according to examples of the present disclosure.

FIG. 1 is an illustration of a system 100 with an atomic instruction set and architecture with interrupt and bus arbitration locking, according to examples of the present disclosure.

System 100 may include a processor 102. Processor 102 may be implemented in any suitable manner, such as by a microcontroller or microprocessor. Processor 102 may be configured to load and execute instructions from any suitable source. Processor 102 may be configured to so load and execute instructions using any suitable architecture or execution pipeline. Illustrated in the figures herein is a simplified, conceptual representation of a possible architecture and execution pipeline. Processor 102 may be configured to operate according to any suitable instructions, such as microcode, digital logic, or any other suitable instructions. Such instructions may be implemented within an article of manufacture 104 such as a machine-readable medium, memory, or firmware. Article of manufacture 104 may be implemented in stand-alone manner or as part of processor 102. Article of manufacture 104 may define an instruction set including instructions that may be handled by processor 102.

System 100 may include a code stream 108. Code stream 108 may be implemented in any suitable manner, such as in a memory or article of manufacture. In one example, code stream 108 may be implemented within article of manufacture 104. Code stream 108 may include instructions that are to be executed by processor 102 to perform any suitable operation. Code stream 108 may be object code that is the result of compilation of source code. Code stream 108 may include instructions defined by the instruction set of article of manufacture 104.

Code stream 108 may include any suitable number and kind of instructions. Shown in the example of FIG. 1 are a first input instruction 110 and a second input instruction 112, though additional input instructions such as a third input instruction 114 (not shown) may be included.

Instructions in code stream 108 may, when executed by processor 102, cause interrupt or bus arbitration locking to be performed. Instructions in code stream 108 may include any suitable designation to indicate that the given instruction is to be executed atomically, wherein interrupts are selectively blocked or busses are selectively locked during execution of the given instruction. Moreover, instructions in code stream 108 may include any suitable designation to indicate that an instruction immediately following the given instruction is to be executed atomically, wherein interrupts are selectively blocked or busses are selectively locked during execution of the instruction immediately following the given instruction. For example, instructions in code stream 108 may include an atomic operation (AO) designation, designating that the instruction and the instruction immediately following are to be executed atomically without interrupts or while busses used by the instruction are locked from other instruction use. The AO designation may be implemented by, for example, a bit or flag. The instruction so flagged may include an opcode that is to designate some other operation, the operation during which interrupts or busses or bus paths are selectively locked. In another example, instructions that are to be designated for such AO operation may have a separate, particular opcode for the other operation that is designated to be performed in an AO manner. For example, a MOV command may be implemented in an AO manner with an AO flag or as a specific opcode designated the AO manner such as MOVAO. The instructions may have any other suitable fields, such as initiator or target fields, or address mode fields.

In one example, a subset of the total number of possible commands that might be executable by processor 102 may be able to be designated with the described AO operation. For example, the AO operation may be available on certain classes of instructions but not for flow control instructions. Such flow control instructions may include conditional branching. For example, BRANCH, CALL, RETURN, and SOFTWARE INTERRUPT type instruction may not be enabled with AO operation capability. By not implementing AO operation for these instructions, deadlock and system starvation issues may be avoided.

By allowing the AO operation designation for an instruction, multiple consecutive instructions may form an atomic sequence of execution, wherein the instructions may be executable without interruption from interrupts or program flow changes until the atomic sequence of execution is complete. In various examples, there may be multiple layers or levels of interrupts, some of which may be allowed or not allowed, given the AO operation.

Some systems provide operating-system level control over interrupts through interrupt masking, wherein interrupts generated by the system go through an interrupt controller with a mask to determine whether the interrupt will be blocked or allowed to proceed. Some such systems do not allow interrupt masking or blocking in a "user" mode, only allowing such control in a higher priority mode such as "system", "supervisor", "privileged", or "admin" mode. Software is often required to issue a software interrupt to change modes between user mode and one of these other modes to allow for the masking or selective blocking of interrupts that would potentially alter the flow of a software program sequence. By implementing the atomic operation at the instruction level, the need to switch user modes may be avoided. Examples of the present disclosure may remove a need to switch operational modes (user to system or privileged) to control the recognition of the interrupt.

In one example, if a given instruction has its AO designation set to true, whether by a bit or by an inherent indication by way of its opcode, interrupts may be selectively blocked and a bus or bus path used by a initiator and a target of the instruction may be locked for the duration at least of the execution of the instruction and the immediately following instruction. If the immediately following instruction is also so designated with an AO designation set to true, then the interrupts may be selectively blocked and the bus or bus path used by the initiator and the target of the instruction may be locked for the duration of at least the execution of the instruction, the immediately following instruction, and another immediately following instruction. This may continue for as many consecutive instructions as are designated with an AO designation set to true. This may allow instructions to be grouped and executed as a single instruction. This may remove the overhead of executing a software interrupt to change operating system modes multiple times in order to suppress interrupts for a given chain of commands.

This operation is illustrated in FIG. 1. Processor 102 may read instructions from code stream 108. Processor 102 may read a first instruction INSTR1 110 in code stream 108. Processor 102 may identify INSTR1 110 at (1). At (2), processor 102 may recognize that INSTR1 110 is designated to operate in an AO manner through, for example, an AO bit set to TRUE or through the inherent designation of INSTR1 110. In FIG. 1, an execution timeline is illustrated. At (3), interrupts may be selectively blocked. The operations of (1), (2), (3) may be performed before execution of INSTR1 110 during, for example, a load or other suitable pre-execution phase. In various examples, such a load or other suitable pre-execution phase may occur in parallel with execution of a previous instruction (not shown). Moreover, execution of INSTR1 110 may be performed in parallel with such a load or other suitable pre-execution phase of a subsequent instruction such as INSTR2 112, although execution of INSTR1 110 is shown as ending before such a load or other suitable pre-execution phase of INSTR 112.

Interrupts may be selectively blocked for a duration of the execution of INSTR1 110 and the execution of the immediately following instruction, INSTR2 112. Moreover, such a selective blocking may be performed for at least the duration of the execution of INSTR1 110 and the execution of the immediately following instruction, INSTR2 112, as selective blocking of interrupts may be further extended for additional instruction execution, depending upon the AO status of INSTR2 112, discussed in more detail below in the context of FIG. 2.

Interrupts may be generated by any suitable part of system 100, represented in FIG. 1 by system elements 120. System elements 120 may include, for example, processor peripherals, software executing on processor 102, memory, memory controllers, or any suitable hardware. System elements 120 generating the interrupt may be within processor 102 itself. Processor 102 may be configured to block interrupts upon a suitable setting, such as the designation of AO for a given instruction or instructions following therefrom.

At (4), INSTR1 110 may be executed.

Figure 2:
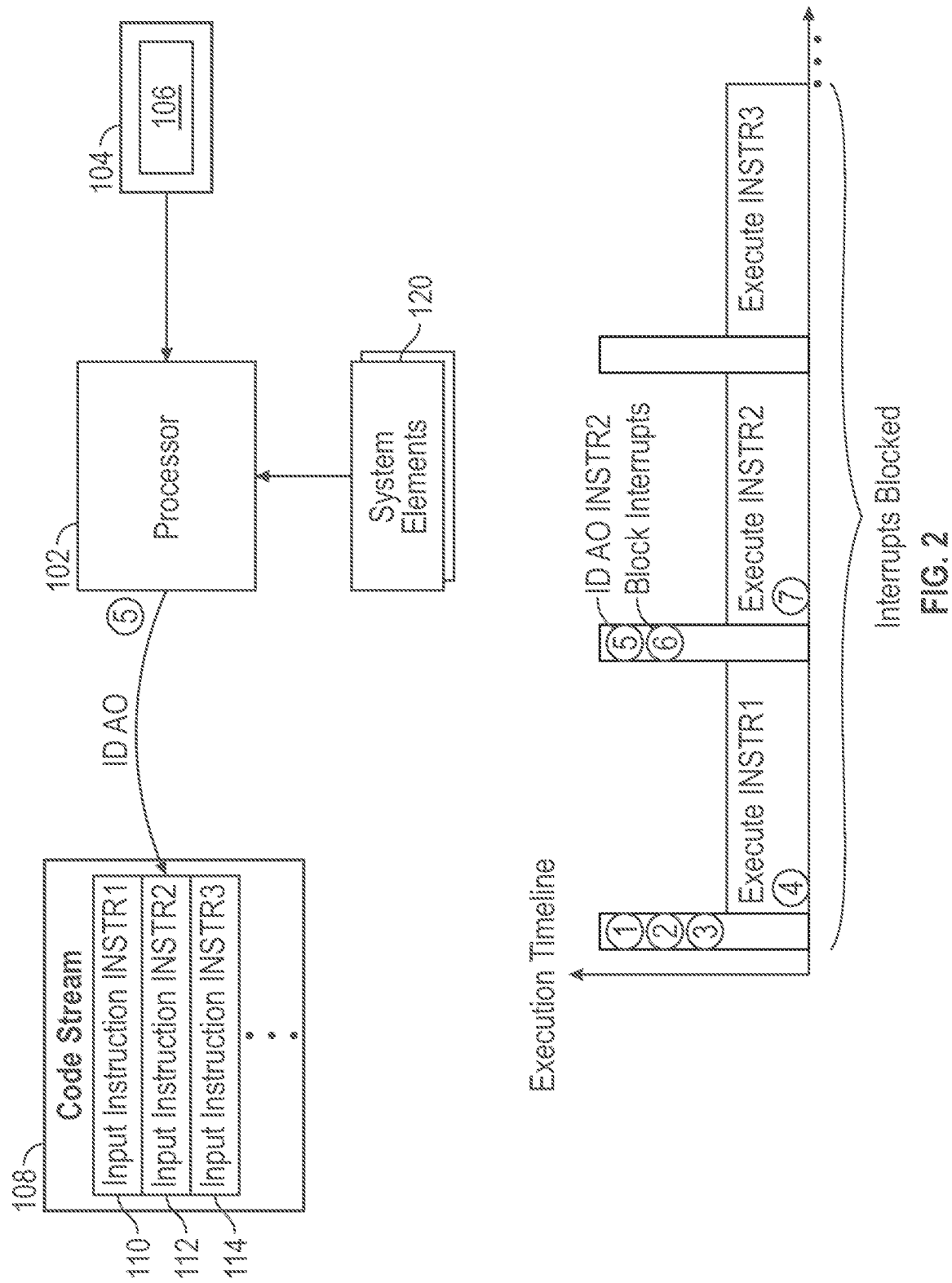
FIG. 2 is an illustration of further operation of the system, according to examples of the present disclosure.

FIG. 2 is an illustration of further operation of system 100, according to examples of the present disclosure.

Processor 102 may read a second instruction INSTR2 112 in code stream 108. At (5), processor 102 may recognize that INSTR2 112 is designated to operate in an AO manner through, for example, an AO bit set to TRUE or through the inherent designation of INSTR2 112. In FIG. 2, an execution timeline is illustrated. At (6), interrupts may be selectively blocked. Interrupts may be selectively blocked for at least the duration of the execution of an instruction that immediately follows INSTR2 112, such as INSTR3 114. Interrupts may be selectively blocked for the duration of instructions following INSTR3 114, depending on whether INSTR3 114 includes an AO designation.

At (7), INSTR2 112 may be executed.

Figure 3:
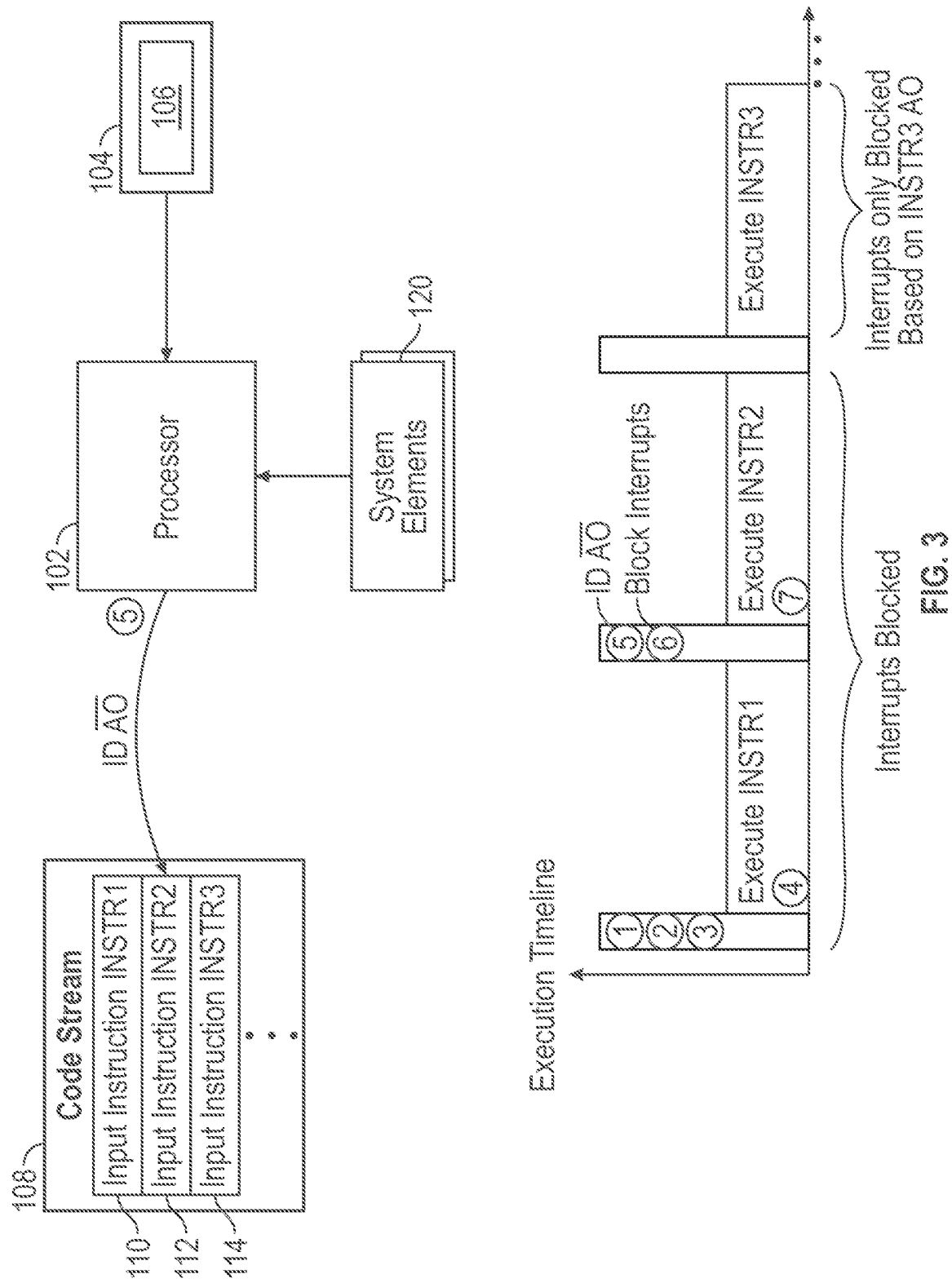
FIG. 3 is an illustration of still further operation of the system, according to examples of the present disclosure.

FIG. 3 is an illustration of further operation of system 100, according to examples of the present disclosure. FIG. 3 presents an alternative operation as shown in FIG. 2, wherein INSTR2 112 is instead not designated to operate in an AO manner though, for example, an AO bit set to FALSE or through the inherent designation of INSTR2 112. This may be recognized at (5). At (6), interrupt blocking may be discontinued after the execution of INSTR2 112. Interrupt blocking might resume, but only if a subsequent instruction such as INSTR3 114 is designated to operate in an AO manner.

At (7), INSTR2 112 may be executed.

Figure 4:
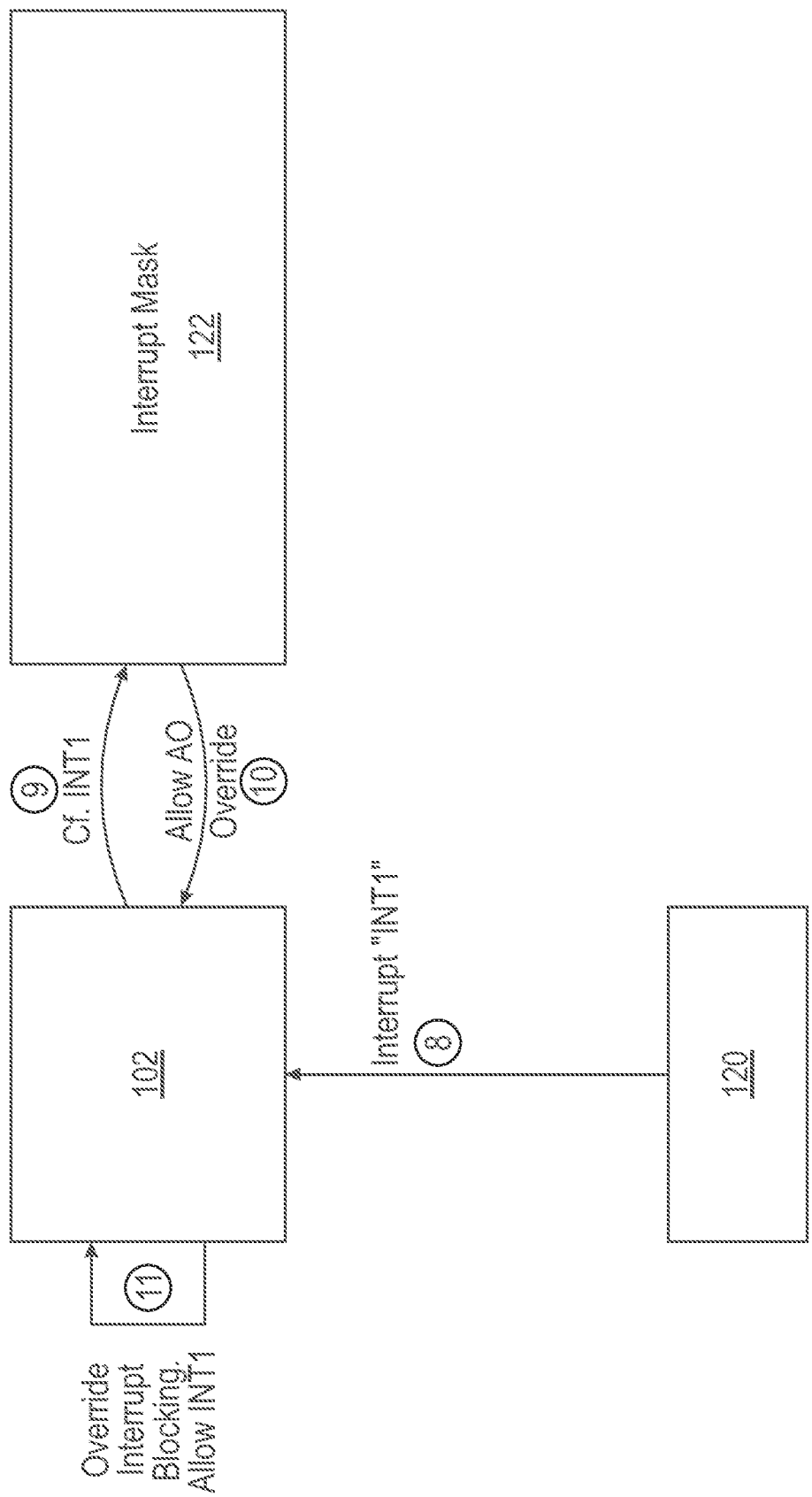
FIG. 4 is an illustration of operation of the system with an interrupt mask, according to examples of the present disclosure.

FIG. 4 is an illustration of operation of system 100 with an interrupt mask 122, according to examples of the present disclosure. Interrupt mask 122 may be implemented in any suitable manner, such as in memory, a special function register, or other suitable entities. Interrupt mask 122 may be accessed by processor 102 or any other suitable entity that performs interrupt blocking.

Interrupt mask 122 may be configured to define which interrupts may be affected by an AO designation and subsequent interrupt blocking. That is to say that even if interrupt blocking has been enabled, such interrupt blocking may be overridden and an interrupt allowed. The overriding of interrupt blocking may be based upon the instruction. The overriding of interrupt blocking may be based upon the identify or class of the interrupt. The overriding of interrupt blocking may be based upon a combination of the instruction and the identity or class of the interrupt.

For example, BRANCH, CALL, RETURN, and SOFTWARE INTERRUPT type instructions might be able to mask some interrupts, but not high priority or timeout interrupts. Other instructions might be able to mask all interrupts. In other examples, the same protected code segment of chained instructions with consecutive AO designations can allow a program sequence to use different levels of interrupt masking without changing the code segment through layers of priority defined in interrupt mask 122.

In FIG. 4, at (8) an interrupt "INT1" may be generated by a system element 120. Processor 102, or an interrupt controller therein or communicatively coupled to processor 102, may then compare the interrupt and any other suitable information with information in interrupt mask 122. Based upon the information in interrupt mask 122, which may include evaluation of the interrupt or the instruction which has blocked interrupts, the AO may be allowed or disallowed to be overridden at (10). At (11), processor 102 may override interrupt blocking and allow INT1, or disallow INT1 and maintain execution of the instruction.

Figure 5:
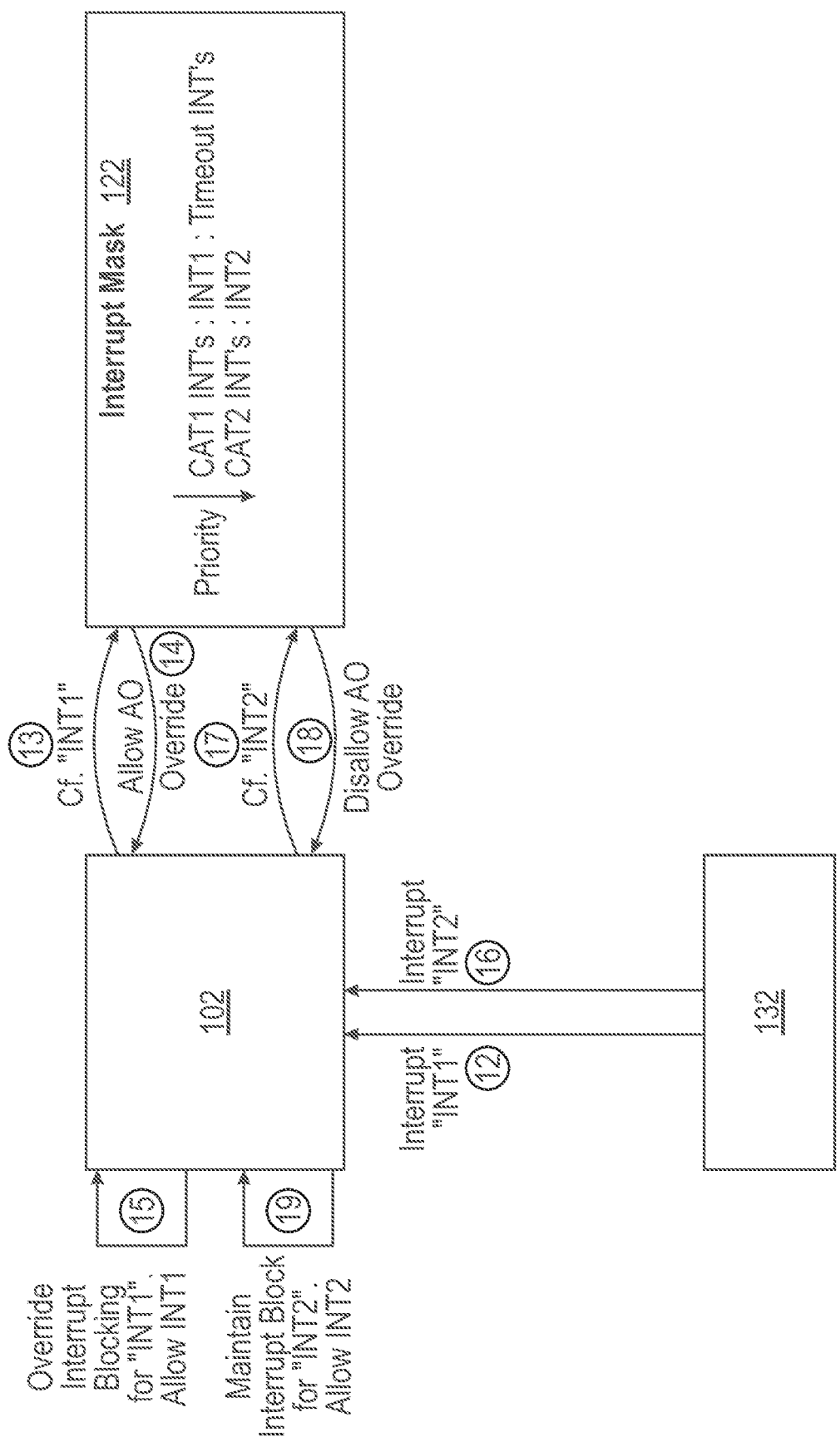
FIG. 5 is an illustration of more detailed operation of the system with an interrupt mask, according to examples of the present disclosure.

FIG. 5 is an illustration of more detailed operation of system 100 with an interrupt mask 122, according to examples of the present disclosure.

At (12), an interrupt such as "INT1" may be received at processor 102 from a system element 132.

At (13), processor 102 or an interrupt handler may compare INT1 against interrupt mask 122.

Interrupt mask 122 may define various categories of interrupts. For example, interrupt mask 122 may define a first category of interrupts, shown as CAT1 interrupts. These may include, for example, timeout interrupts. Such timeout interrupts may be generated by any suitable system element 132 upon, for example, an attempt to use a system resource that has not been successful in receiving a response. In another example, timeout interrupts may be generated by timers such as countdown timers upon reaching the expiration of the defined timer period. Interrupt mask 122 may define a second category of interrupts. Such a second category may include, for example, any other category other than timeout interrupts. The second category may include, for example, memory interrupts, analog to digital conversion interrupts, digital to analog conversion interrupts, processor peripheral interrupts, or external interrupts. More categories may be used than are shown. The list of categories may be presented in an order of priority with regards to overriding interrupt blocking. Interrupts of the first category may be allowed to override interrupt blocking, while interrupts of the second category and lower might be prevented from overriding interrupt blocking.

At (14), since INT1 is in a first category of interrupts because it is a timeout interrupt, interrupt mask 122 may define that it is allowed to override AO and selective interrupt blocking.

At (15), processor 102 or an interrupt handler may thus override the selective interrupt blocking and allow execution of INT1.

At (16), a second interrupt "INT2" may be generated by a system resource 132. INT2 may be, for example, an external interrupt.

At (17), INT2 may be compared with the contents of interrupt mask 122. As INT2 is in the second category of interrupts (or lower), at (18) interrupt mask 122 may define that INT2 is not allowed to override AO and selective interrupt blocking.

At (19), processor 102 or an interrupt handler may thus maintain the selective interrupt blocking and disallow execution of INT2.

Interrupt mask 122 and the operation examples shown in FIGS. 4-5 may also be applied to bus or bus path locking, wherein bus locking may be overridden for particular interrupts according to interrupt priority.

Figure 6:
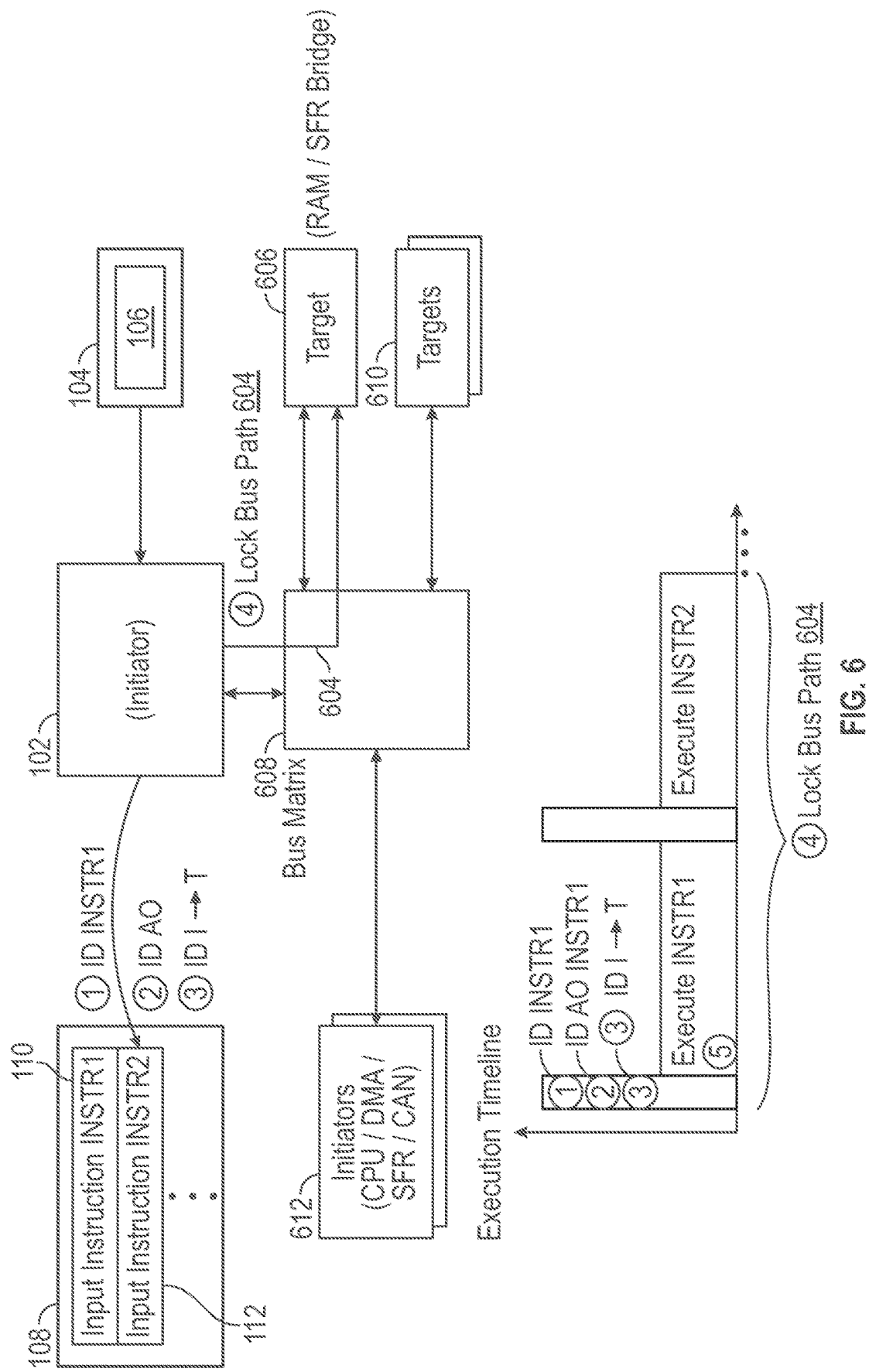
FIG. 6 is a more detailed illustration of the system for locking busses and bus paths, according to examples of the present disclosure.

FIG. 6 is a more detailed illustration of system 100 for locking busses and bus paths, according to examples of the present disclosure. Busses may be locked according to the same criteria of AO designations as described above for interrupt blocking.

Busses may be locked according to specific bus paths, for example. Shown in FIG. 6 is a bus path from an initiator, such as processor 102, to a target, such as memory, read-only-memory, a bridge, microcontroller peripherals, or special function register bridge. Multiple initiators 612 may be present in system 100, and may include elements such as processors, central processing units, direct memory access controllers, special function registers, controller area network controllers, or peripherals of a microcontroller. Multiple targets 606, 610 may be present in system 100, and may include any suitable target as discussed above.

A bus matrix 608 or bus fabric may be used to selectively route data communication paths such as bus path 604 between a given initiator and a given target in system 100. Processor 102 may lock the particular bus path 604 between itself and a target identified in an instruction of code stream 110 for its exclusive use with respect to other initiators such as initiators 612.

At (1), processor 102 may identify INSTR1 110 to be executed in code stream 108. At (2), processor 102 may identify that INSTR1 110 includes an AO designation set to TRUE such as an AO bit or inherently through the opcode of INSTR1 110.

At (3), processor 102 may identify that INSTR1 110 otherwise includes an access of a target 606 by an initiator 602. Such an access may include a move, or storing of a result of a mathematical operation, or any other suitable access. Target 606 and initiator 602 may be defined by, for example, parameters used by INSTR1 110.

At (4), processor 102 may lock a bus path 604 between initiator 602 and target 606. Other transfers using bus path 604 may be rerouted, or such other transfers may be denied use of bus path 604. Typically, a bus or bus path may be locked only for the duration of the execution of a given instruction. As shown in FIG. 6, bus path 604 may be locked for a duration of the execution of INSTR1 110 and INSTR2 112 based upon the AO designation in INSTR1 110. Bus path 604 may continue to be locked past the execution of INSTR2 112 depending upon the AO designation in INSTR2 112 (not shown).

Figure 7:
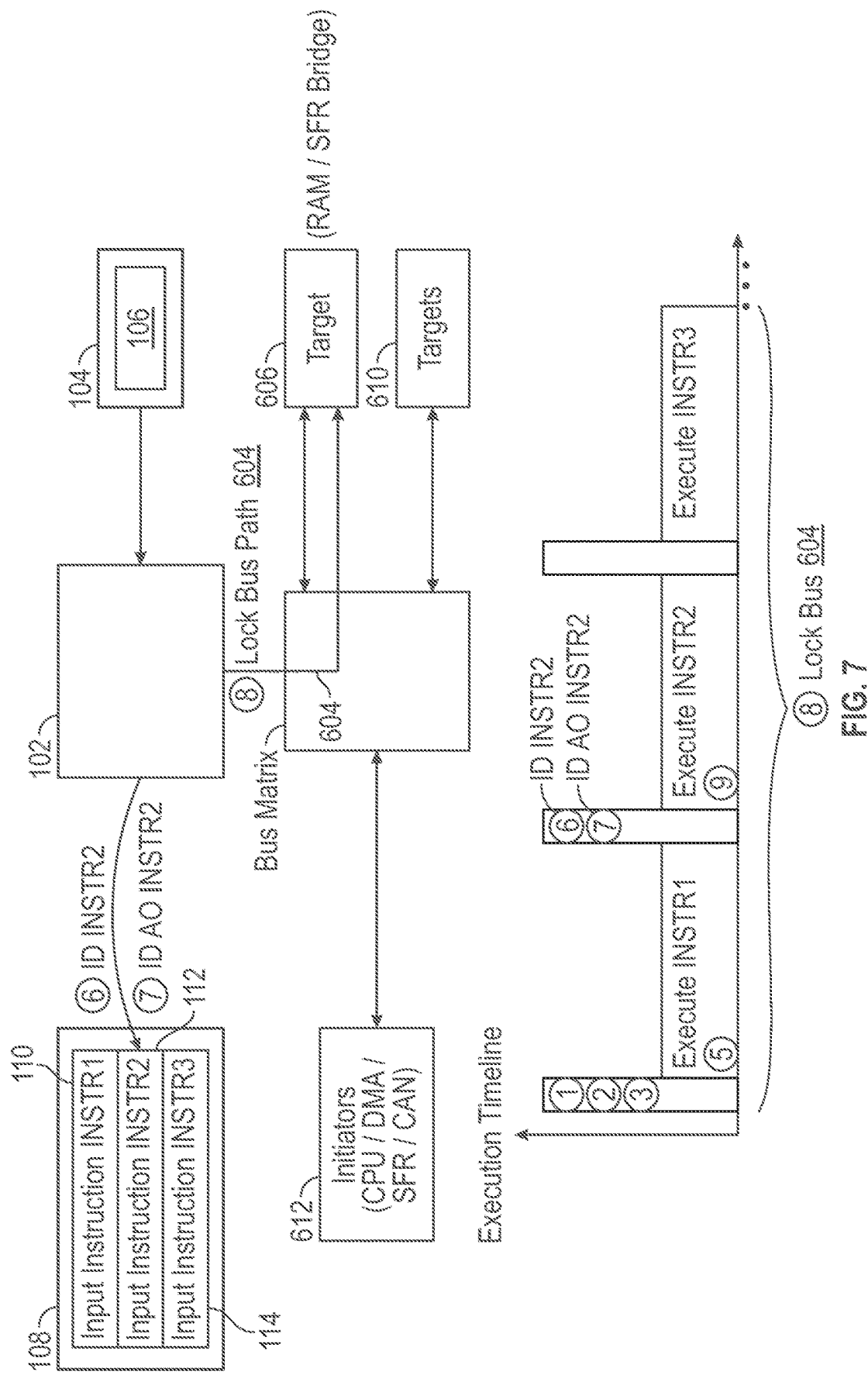
FIG. 7 is another more detailed illustration of the system for locking busses and bus paths, according to examples of the present disclosure.

FIG. 7 is a more detailed illustration of system 100 for locking busses or bus paths, according to examples of the present disclosure. At (6), INSTR2 112 may be identified by processor 102. At (7), INSTR2 112 may be identified as having an AO designation set to TRUE. At (8), bus path 604 may continue to be locked through the duration of an immediately following instruction such as INSTR3 114. In various examples, INSTR2 112 might not have the designation of initiator 602 and target 606 that was included in INSTR1 110, but nevertheless bus path 604 may continue to be blocked during the execution of INSTR2 112. Moreover, INSTR3 114 might not have the designation of initiator 602 and target 606 that was included in INSTR1 110, but nevertheless bus path 604 may continue to be blocked during the execution of INSTR3 114.

Figure 8:
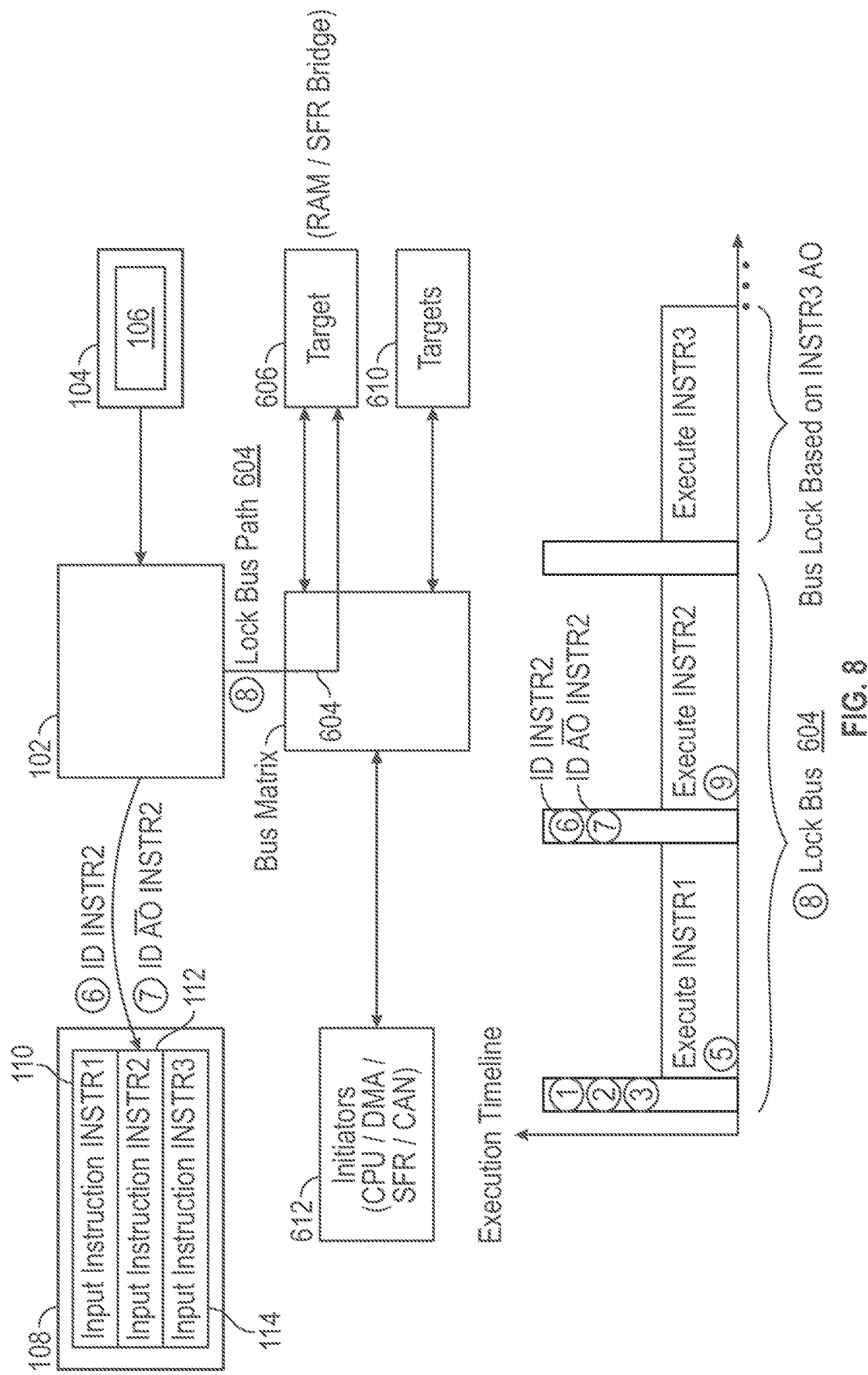
FIG. 8 is yet another more detailed illustration of the system for locking busses, according to examples of the present disclosure.

FIG. 8 is a more detailed illustration of system 100 for locking busses or bus paths, according to examples of the present disclosure. At (6), INSTR2 112 may be identified by processor 102. At (7), INSTR2 112 may be identified as not having an AO designation set to TRUE, and may be set to FALSE or simply not present. At (8), bus path 604 may discontinue being blocked after execution of the instruction INSTR2 112. In various examples, INSTR2 112 might not have the designation of initiator 602 and target 606 that was included in INSTR1 110, but nevertheless bus path 604 may continue to be blocked during the execution of INSTR2 112. Bus path 604 might be locked beginning at the execution of INSTR3 114 depending upon the AO designation of INSTR3 114.

Locking of bus path 604 may be performed in any suitable manner, such as at the direction of processor 102. Locking of bus 605 may be performed by, for example, control logic of processor 102. Furthermore, locking of bus path 604 may be exported or communicated to other elements (not shown) of system 100.

Accordingly, examples of the present disclosure include an instruction set for a processor that allows groups of instructions to be executed without interruption—that is, atomically. A per instruction tag, bit, or other designation may remove a requirement for firmware to manipulate processor interrupts to block interruptions in executions through entering or exiting modes. Such a designation may remove a requirement to switch in and out of supervisor mode. Examples of the present disclosure may provide lock signals to bus fabrics to block command interlacing from other initiators (such as other processors, direct memory access controllers, CAN controllers, etc.). Examples of the present disclosure may enable the creation of complex instructions via contiguous execution of instruction group with an AO designation. Examples of the present disclosure may provide guaranteed timing for instruction groups. Examples of the present disclosure may be used to block interlacing of instructions due to context switching. Examples of the present disclosure may be limited to a subset of possible instructions to prevent CPU hazards like starvation or deadlock. Examples of the present disclosure may be used when accessing internal or external hardware that requires seamless transactions, such as firmware generation of multi-phase interactions. Examples of the present disclosure may be used for generation of signal patterns or instructions that require consistent timing, such as bit-banging. Examples of the present disclosure may be used for guaranteed sequential pattern generation, wherein output data or addresses cannot be interrupted or interlaced with other instructions.

FIGS. 9-12 are illustrations of example methods 900, 1000, 1100, 1200 for selectively blocking interrupts and locking busses or bus paths, according to examples of the present disclosure. Methods 900, 1000, 1100, 1200 may be performed by any suitable elements such as system 100 of FIGS. 1-8 or processor 102 therein. Methods 900, 1000, 1100, 1200 may be performed with more or fewer steps than shown. Methods 900, 1000, 1100, 1200 may begin at any suitable step. The steps of methods 900, 1000, 1100, 1200 may be performed in any suitable order, including variations from the order presented in the figures. The steps of methods 900, 1000, 1100, 1200 may be optionally repeated, omitted, performed in parallel with one another, or performed recursively. Moreover, methods 900, 1000, 1100, 1200 may be performed in parallel with respect to one another.

Figure 9:
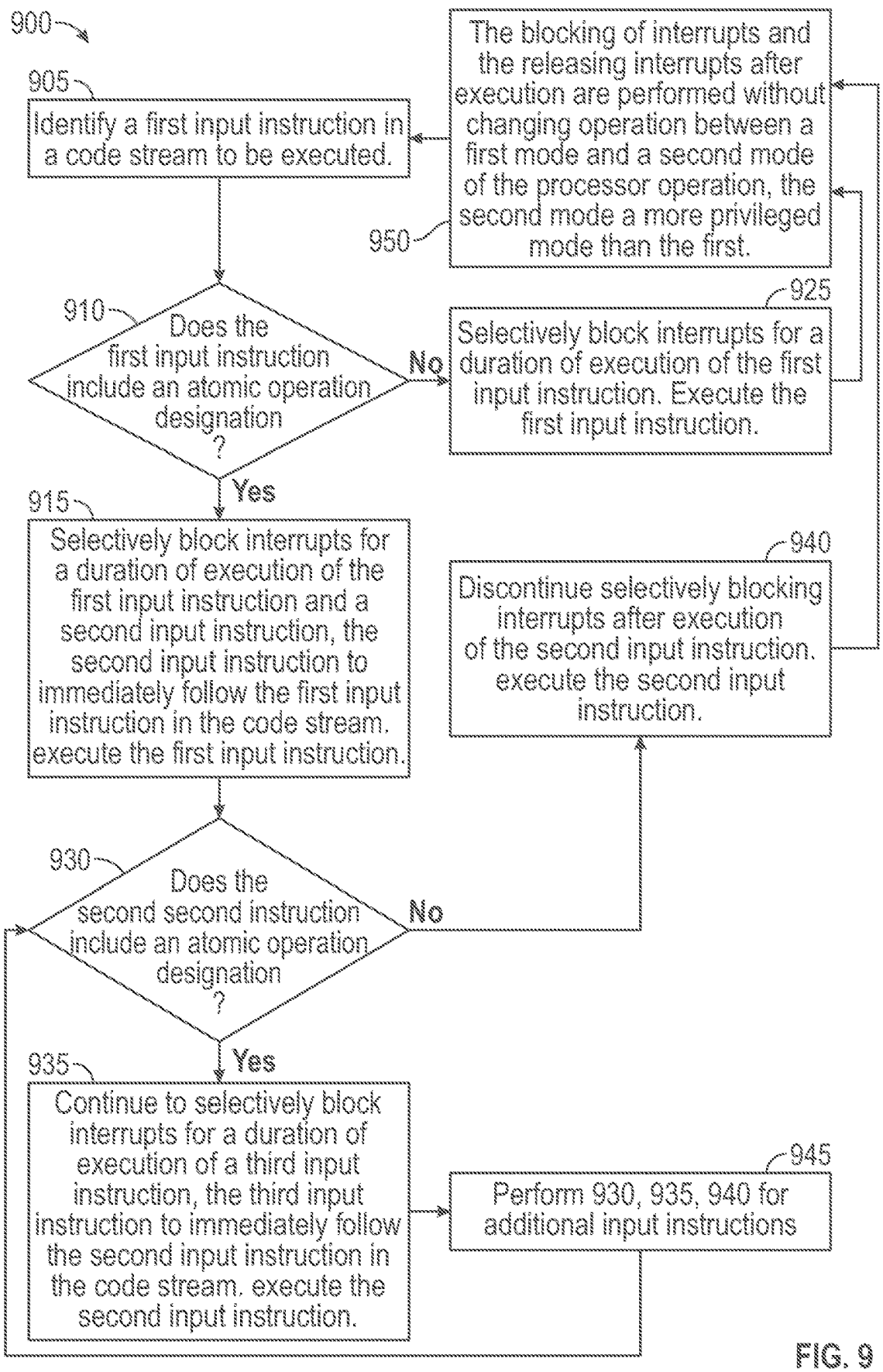
FIG. 9 is an illustration of an example method for selectively blocking interrupts, according to examples of the present disclosure.

FIG. 9 is an illustration of an example method 900 for selectively blocking interrupts, according to examples of the present disclosure.

At 905, a first input instruction in a code stream to be executed may be identified.

At 910, it may be determined whether the first input instruction includes an atomic operation designation. If the first input instruction includes an atomic operation designation, method 900 may proceed to 915. Otherwise, method 900 may proceed to 925.

At 915, interrupts may be selectively blocked for a duration of execution of the first input instruction and a second input instruction. The second input instruction may immediately follow the first input instruction in the code stream. The first input instruction may be executed. Method 900 may proceed to 930.

At 925, interrupts may be selectively blocked for a duration of execution of the first input instruction. The first input instruction may be executed. Method 900 may proceed to 945.

At 930, it may be determined whether the second input instruction includes an atomic operation designation. If the second input instruction includes an atomic operation designation, method 900 may proceed to 935. Otherwise, method 900 may proceed to 940.

At 935, interrupts may continue to be selectively blocked for a duration of execution of a third input instruction. The third input instruction may immediately follow the second input instruction in the code stream. The second input instruction may be executed. Method 900 may proceed to 945.

At 940, selective blocking of interrupts may be discontinued after execution of the second input instruction. The second input instruction. Method 900 may proceed to 950.

At 945, the steps of 930, 935, 940 may be performed for additional input instructions. Such a fourth input instruction, for example, may be evaluated at another instance of 930 for an atomic operation designation, wherein the fourth input instruction immediately follows the third input instruction in the code stream.

At 950, which may be performed at any suitable part of method 900, the blocking of interrupts and the releasing interrupts after execution may be performed without changing operation between a first mode and a second mode of processor operation of the processor, wherein the second mode is a more privileged mode than the first mode.

Figure 10:
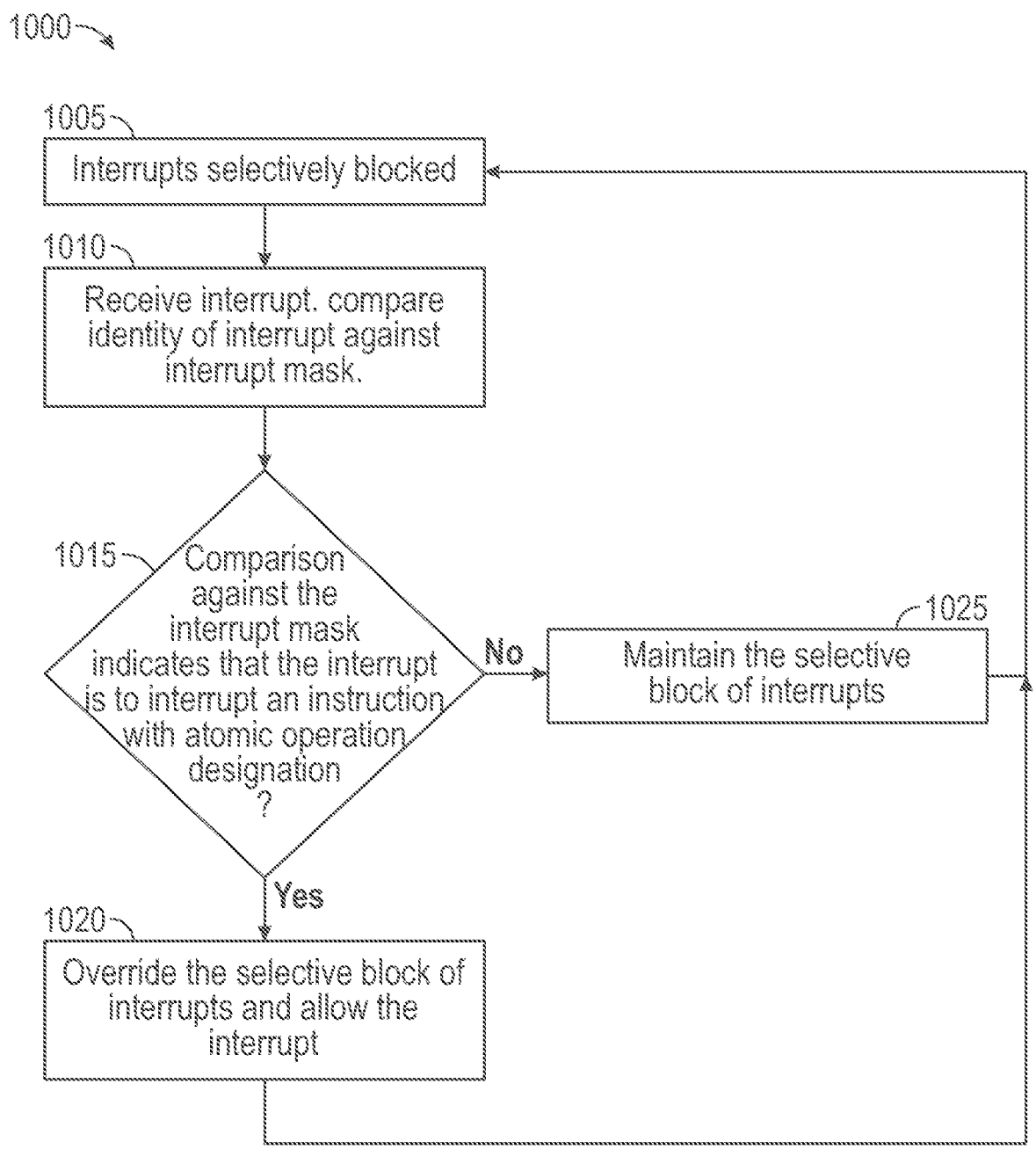
FIG. 10 is an illustration of an example method for handling interrupts that are selectively blocked, according to examples of the present disclosure.

FIG. 10 is an illustration of an example method 1000 for handling interrupts that are selectively blocked, according to examples of the present disclosure. Method 1000 may be performed within the framework of method 900 whenever an interrupt is received while interrupts are selectively blocked.

At 1005, interrupts may be selectively blocked by, for example, 915, 925, 935, or 940 in method 900.

At 1010, an interrupt may be received during selective blocking.

At 1015, the interrupt may be compared against an interrupt mask. The interrupt mask may indicate whether the interrupt is allowed to interrupt an instruction that is being executed with an atomic operation designation. If so, method 1000 may proceed to 1020. Otherwise, method 1000 may proceed to 1025.

At 1020, the selective blocking of interrupts may be overridden and the interrupt may be allowed to interrupt the executing instruction. Method 1000 may return to 1005.

At 1025, the selective blocking of interrupts may be maintained and the interrupt may be prevented from interrupting the executing instruction. Method 1000 may return to 1005.

Figure 11:
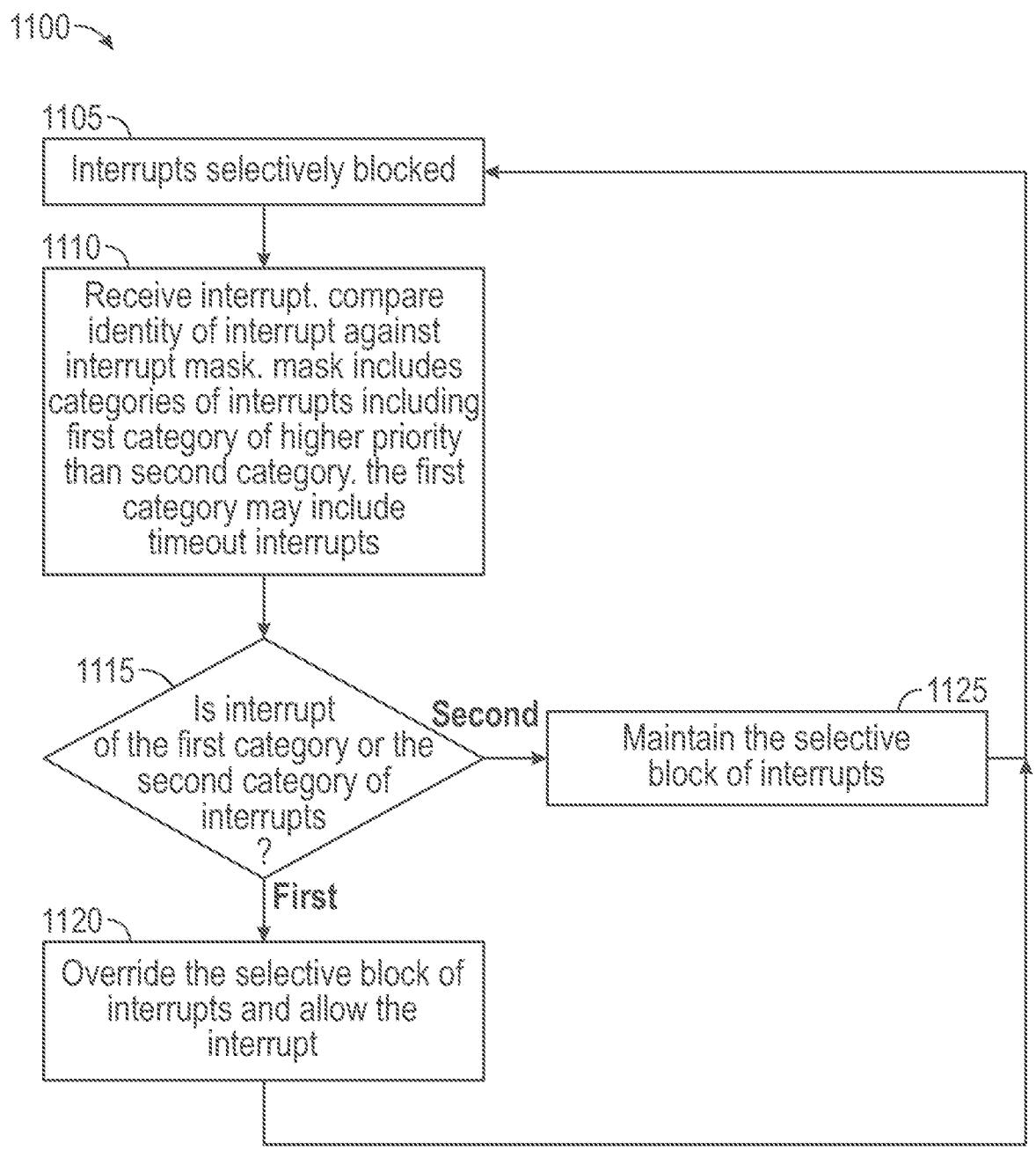
FIG. 11 is an illustration of another example method for handling interrupts that are selectively blocked, according to examples of the present disclosure.

FIG. 11 is an illustration of another example method 1100 for handling interrupts that are selectively blocked, according to examples of the present disclosure. Method 1100 may be performed within the framework of method 900 whenever an interrupt is received while interrupts are selectively blocked.

At 1105, interrupts may be selectively blocked by, for example, 915, 925, 935, or 940 in method 900.

At 1110, an interrupt may be received during selective blocking.

At 1115, the interrupt may be compared against an interrupt mask. The interrupt mask may include categories of interrupts. The categories may include a first category of interrupts and a second category of interrupts. The first category may be of a higher priority of interrupts than the second category. The first category may include, for example, timeout interrupts. The received interrupt may be determined to be within the first category or the second category. If the received interrupt is of the first category, method 1100 may proceed to 1120. Otherwise, method 1100 may proceed to 1125.

At 1120, the selective blocking of interrupts may be overridden and the interrupt may be allowed to interrupt the executing instruction. Method 1100 may return to 1105.

At 1125, the selective blocking of interrupts may be maintained and the interrupt may be prevented from interrupting the executing instruction. Method 1100 may return to 1105.

Figure 12:
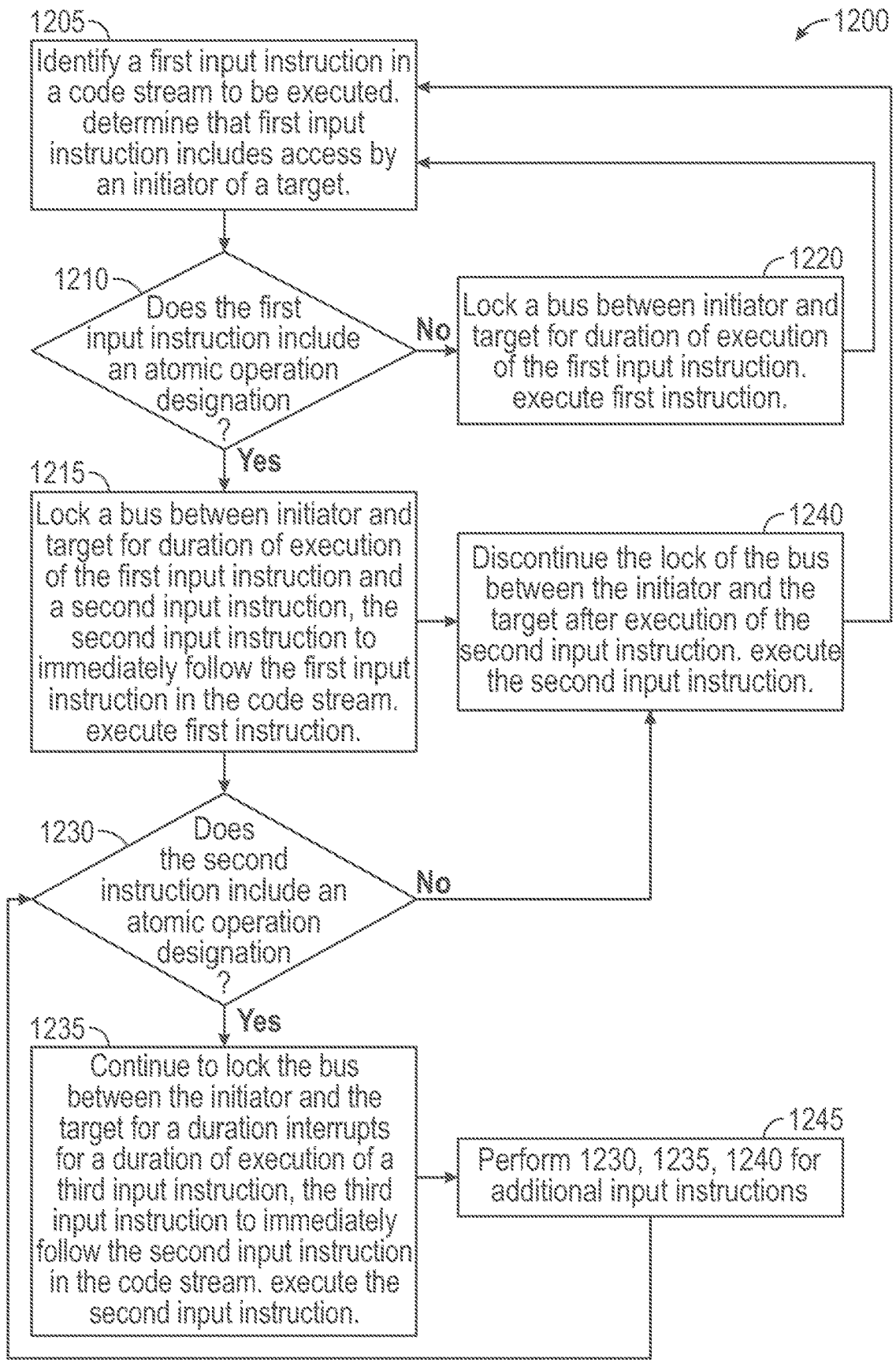
FIG. 12 is an illustration of an example method for selectively locking a bus or bus path, according to examples of the present disclosure.

FIG. 12 is an illustration of an example method 1200 for selectively locking a bus or bus path, according to examples of the present disclosure. Method 1200 may be performed in conjunction with the methods of FIGS. 9-11 for blocking interrupts.

At 1205, a first input instruction in a code stream to be executed may be identified. The input instruction may be determined to include access by an initiator, such as processor 102, of a target.

At 1210, it may be determined whether the first input instruction includes an atomic operation designation. If the first input instruction includes an atomic operation designation, method 1200 may proceed to 1215. Otherwise, method 900 may proceed to 1220.

At 1215, a bus or bus path between the initiator and the target may be locked for a duration of execution of the first input instruction and a second input instruction. The second input instruction may immediately follow the first input instruction in the code stream. The first input instruction may be executed. Method 1200 may proceed to 1230.

At 1220, a bus or bus path between the initiator and the target may be locked for a duration of execution of the first input instruction. The first input instruction may be executed. Method 1200 may proceed to 1205.

At 1230, it may be determined whether the second input instruction includes an atomic operation designation. If the second input instruction includes an atomic operation designation, method 1200 may proceed to 1235. Otherwise, method 1200 may proceed to 1240.

At 1235, the bus or bus path may continue to be locked for a duration of execution of a third input instruction. The third input instruction may immediately follow the second input instruction in the code stream. The second input instruction may be executed. Method 1200 may proceed to 1245.

At 1240, selective blocking of interrupts may be discontinued after execution of the second input instruction. The second input instruction. Method 1200 may proceed to 1205.

At 1245, the steps of 1230, 1235, 1240 may be performed for additional input instructions. Such a fourth input instruction, for example, may be evaluated at another instance of 1230 for an atomic operation designation, wherein the fourth input instruction immediately follows the third input instruction in the code stream.

Examples of the present disclosure may include an article of manufacture. The article may include a non-transitory machine-readable medium. The medium may include instructions. The instructions, when read and executed by a processor, may cause the processor to identify a first input instruction in a code stream to be executed. The instructions may cause the processor to determine that the first input instruction includes an atomic operation designation. The instructions may cause the processor to, based a determination that the first input instruction includes the atomic operation designation, selectively block interrupts for a duration of execution of the first input instruction and a second input instruction. The second input instruction may immediately follow the first input instruction in the code stream. The instructions may cause the processor to execute the first input instruction. The atomic operation designation may be inherent to the input instruction, or may be a parameter of the input instruction such as a bit or flag.

In combination with any of the above examples, the processor may be to determine that the second input instruction includes the atomic operation designation. In combination with any of the above examples, the processor may be to, based on a determination that the second input instruction includes the atomic operation designation, continue the selective block of interrupts for a duration of execution of the second input instruction and a third input instruction. The third input instruction may immediately follow the second input instruction in the code stream. In combination with any of the above examples, the processor may be to execute the second input instruction.

In combination with any of the above examples, the processor may be to determine that the second input instruction does not include the atomic operation designation, execute the second input instruction, and, based on a determination that the second input instruction does not include the atomic operation designation, discontinue the selective block of interrupts after execution of the second input instruction.

In combination with any of the above examples, the processor may be to receive an interrupt, compare an identity of the interrupt against an interrupt mask, and, based on a determination that the comparison against the interrupt mask indicates that the interrupt is to interrupt an instruction with the atomic operation designation, override the selective block of interrupts for the duration of execution of the first input instruction and the second input instruction and allow the interrupt.

In combination with any of the above examples, the processor may be to receive an interrupt, compare an identity of the interrupt against an interrupt mask, and based on a determination that the comparison against the interrupt mask indicates that the interrupt is of a first category of interrupts, override the selective block of interrupts for the duration of the execution of the first input instruction and the second input instruction and allow the interrupt. Furthermore, in combination with any of the above examples, the processor may be to, based on a determination that the comparison of against the interrupt mask indicates that the interrupt is of a second category of interrupts, maintain the selective block of interrupts for the duration of the execution of the first input instruction and the second input instruction and block the interrupt. The first category of interrupts may be of a higher priority than the second category of interrupts.

In combination with any of the above examples, the first category of interrupts may include timeout interrupts.

In combination with any of the above examples, the processor may be to operate in a first mode and in a second mode, wherein the second mode is a more privileged mode of operation than the first mode. The processor may be to block interrupts for the duration of execution of the first input instruction and the second input instruction and release interrupts after execution of the second input instruction without changing operation between the first mode and the second mode.

Examples of the present disclosure may include an article of manufacture. The article may include a non-transitory machine-readable medium. The medium may include instructions. The instructions, when read and executed by a processor, may cause the processor to identify a first input instruction in a code stream to be executed, determine that the first input instruction includes an atomic operation designation, determine that that the first input instruction includes an access by an initiator of a target, and based on a determination that the first input instruction includes the atomic operation designation, lock a bus or bus path between the initiator and the target for a duration of execution of the first input instruction and a second input instruction. The second input instruction may immediately follow the first input instruction in the code stream. The processor may be to execute the first input instruction. The processor may be implemented in the same processor of any of the above examples. The bus may be locked in relevant part by locking a bus path therein between the initiator and the target.

In combination with any of the above examples, the processor may be to determine that the second input instruction includes the atomic operation designation and, based on a determination that the second input instruction includes the atomic operation designation, continue the selective lock of the bus or bus path between the initiator and the target for a duration of execution of the second input instruction and a third input instruction. The third input instruction may immediately follow the second input instruction in the code stream. In combination with any of the above examples, the processor may be to execute the second input instruction.

In combination with any of the above examples, the processor may be to determine that the second input instruction does not include the atomic operation designation, and, based on a determination that the second input instruction does not include the atomic operation designation, discontinue the selective lock on the bus or bus path between the initiator and the target after execution of the second input instruction. In combination with any of the above examples, the processor may be to execute the second input instruction.

Although examples have been described above, other variations and examples may be made from this disclosure without departing from the spirit and scope of these examples.

We claim:

1. An article of manufacture comprising a non-transitory machine-readable medium, the medium comprising instructions, the instructions, when read and executed by a processor, cause the processor to:
   identify a first input instruction in a code stream to be executed;
   determine that the first input instruction specifies an atomic operation designation to atomically execute the first input instruction and a second input instruction to immediately follow the first input instruction in the code stream;
   based a determination that the first input instruction specifies the atomic operation designation to atomically execute the first input instruction and a second input instruction to immediately follow the first input instruction in the code stream, selectively block interrupts for a duration of execution of the first input instruction and the second input instruction; and
   execute the first input instruction.

2. The article of claim 1, wherein the processor is to:
   determine that the second input instruction specifies an atomic operation designation to atomically execute the second input instruction and a third input instruction to immediately follow the first input instruction in the code stream;
   based on a determination that the second input instruction specifies the atomic operation designation to atomically execute the second input instruction and a third input instruction to immediately follow the first input instruction in the code stream, continue the selective block of interrupts for a duration of execution of the second input instruction and the third input instruction; and
   execute the second input instruction.

3. The article of claim 1, wherein the processor is to:
   determine that the second input instruction does not specify the atomic operation designation to atomically execute the second input instruction and a third input instruction to immediately follow the second input instruction in the code stream;

execute the second input instruction; and based on a determination that the second input instruction does not specify the atomic operation designation to atomically execute the second input instruction and a third input instruction to immediately follow the second input instruction in the code stream, discontinue the selective block of interrupts after execution of the second input instruction.

4. The article of claim 1, wherein the processor is to:

receive an interrupt;

compare an identity of the interrupt against an interrupt mask; and based on a determination that the comparison against the interrupt mask indicates that the interrupt is to interrupt an instruction with the atomic operation designation, override the selective block of interrupts for the duration of execution of the first input instruction and the second input instruction and allow the interrupt.

5. The article of claim 1, wherein the processor is to:

receive an interrupt;

compare an identity of the interrupt against an interrupt mask;

based on a determination that the comparison against the interrupt mask indicates that the interrupt is of a first category of interrupts, override the selective block of interrupts for the duration of the execution of the first input instruction and the second input instruction and allow the interrupt;

based on a determination that the comparison of against the interrupt mask indicates that the interrupt is of a second category of interrupts, maintain the selective block of interrupts for the duration of the execution of the first input instruction and the second input instruction and block the interrupt;

wherein the first category of interrupts of a higher priority than the second category of interrupts.

6. The article of claim 5, wherein the first category of interrupts includes timeout interrupts.

7. The article of claim 1, wherein the processor is to:

operate in a first mode and in a second mode, the second mode to be a more privileged mode of operation than the first mode; and block interrupts for the duration of execution of the first input instruction and the second input instruction and release interrupts after execution of the second input instruction without changing operation between the first mode and the second mode.

8. An article of manufacture comprising a non-transitory machine-readable medium, the medium comprising instructions, the instructions, when read and executed by a processor, cause the processor to:

identify a first input instruction in a code stream to be executed;

determine that the first input instruction specifies an atomic operation designation to atomically execute the first input instruction and a second input instruction to immediately follow the first input instruction in the code stream;

determine that that the first input instruction specifies an access by an initiator of a target;

based on a determination that the first input instruction specifies the atomic operation designation to atomically execute the first input instruction and a second input instruction to immediately follow the first input instruction in the code stream, lock a bus between the initiator and the target for a duration of execution of the first input instruction and the second input instruction; and execute the first input instruction.

9. The article of claim 8, wherein the processor is to:

determine that the second input instruction specifies an atomic operation designation to atomically execute the second input instruction and a third input instruction to immediately follow the third input instruction in the code stream;

based on a determination that the second input instruction specifies the atomic operation designation to atomically execute the second input instruction and a third input instruction to immediately follow the third input instruction in the code stream, continue the selective lock of the bus between the initiator and the target for a duration of execution of the second input instruction and the third input instruction; and execute the second input instruction.

10. The article of claim 8, wherein the processor is to:

determine that the second input instruction does not specify the atomic operation designation to atomically execute the second input instruction and a third input instruction to immediately follow the third input instruction in the code stream;

based on a determination that the second input instruction does not specify the atomic operation designation to atomically execute the second input instruction and a third input instruction to immediately follow the third input instruction in the code stream, discontinue the selective lock on the bus between the initiator and the target after execution of the second input instruction; and execute the second input instruction.

11. A method, comprising, at a processor:

identifying a first input instruction in a code stream to be executed;

determining that the first input instruction specifies an atomic operation designation to atomically execute the first input instruction and a second input instruction to immediately follow the first input instruction in the code stream;

based on a determination that the first input instruction specifies the atomic operation designation to atomically execute the first input instruction and a second input instruction to immediately follow the first input instruction in the code stream, selectively blocking interrupts for a duration of execution of the first input instruction and the second input instruction; and executing the first input instruction.

12. The method of claim 11, comprising:

determining that the second input instruction specifies an atomic operation designation to atomically execute the second input instruction and a third input instruction to immediately follow the first input instruction in the code stream;

based on a determination that the second input instruction specifies the atomic operation designation to atomically execute the first input instruction and a second input instruction to immediately follow the first input instruction in the code stream, continuing to selectively block interrupts for a duration of execution of the second input instruction and the third input instruction; and executing the second input instruction.

13. The method of claim 11, comprising:

determining that the second input instruction does not specify the atomic operation designation to atomically execute the second input instruction and a third input instruction to immediately follow the first input instruction in the code stream;

based on a determination that the second input instruction does not specify the atomic operation designation to atomically execute the first input instruction and a second input instruction to immediately follow the first input instruction in the code stream, discontinuing selectively blocking interrupts after execution of the second input instruction; and executing the second input instruction.

14. The method of claim 11, comprising:

receiving an interrupt;

comparing an identity of the interrupt against an interrupt mask; and based on a determination that the comparison against the interrupt mask indicates that the interrupt is to interrupt an instruction with the atomic operation designation, overriding the selective block of interrupts for the duration of execution of the first input instruction and the second input instruction and allow the interrupt.

15. The method of claim 11, comprising:

receiving an interrupt;

comparing an identity of the interrupt against an interrupt mask;

overriding the selective block of interrupts for the duration of the execution of the first input instruction and the second input instruction and allow the interrupt if the comparison against the interrupt mask indicates that the interrupt is of a first category of interrupts; and maintaining the selective block of interrupts for the duration of the execution of the first input instruction and the second input instruction and block the interrupt based if the comparison of against the interrupt mask indicates that the interrupt is of a second category of interrupts;

wherein the first category of interrupts of a higher priority than the second category of interrupts.

16. The method of claim 15, wherein the first category of interrupts includes timeout interrupts.

17. The method of claim 11, wherein:

the processor is to operate in a first mode and in a second mode, the second mode to be a more privileged mode of operation than the first mode; and blocking interrupts for the duration of execution of the first input instruction and the second input instruction and releasing interrupts after execution of the second input instruction are performed without changing operation between the first mode and the second mode.

18. A method, comprising:

identifying a first input instruction in a code stream to be executed;

determining that the first input instruction includes an access by an initiator of a target;

determining that the first input instruction specifies an atomic operation designation to atomically execute the first input instruction and a second input instruction to immediately follow the first input instruction in the code stream;

based on a determination that the first input instruction specifies the atomic operation designation to atomically execute the first input instruction and a second input instruction to immediately follow the first input instruction in the code stream, locking a bus between the initiator and the target for a duration of execution of the first input instruction and the second input instruction; and executing the first input instruction.

19. The method of claim 18, comprising:

determining that the second input instruction specifies an atomic operation designation to atomically execute the second input instruction and a third input instruction to immediately follow the first input instruction in the code stream;

based on a determination that the second input instruction specifies the atomic operation designation to atomically execute the second input instruction and a third input instruction to immediately follow the first input instruction in the code stream, continuing to lock the bus between the initiator and the target for a duration of execution of the second input instruction and the third input instruction; and executing the second input instruction.

20. The method of claim 18, comprising:

determining that the second input instruction does not specify the atomic operation designation to atomically execute the second input instruction and a third input instruction to immediately follow the first input instruction in the code stream;

based on a determination that the second input instruction does not specify the atomic operation designation to atomically execute the second input instruction and a third input instruction to immediately follow the first input instruction in the code stream, discontinuing a lock on the bus between the initiator and the target after execution of the second input instruction; and executing the second input instruction.

\* \* \* \* \*